(12) United States Patent
Laselva et al.

(10) Patent No.: US 12,047,943 B2
(45) Date of Patent: Jul. 23, 2024

(54) TRANSMITTING DATA FROM A USER EQUIPMENT IN RADIO RESOURCE CONTROL INACTIVE STATE

(71) Applicant: Nokia Technologies Oy, Espoo (FI)

(72) Inventors: Daniela Laselva, Klarup (DK); Renato Barbosa Abreu, Aalborg (DK); Thomas Jacobsen, Nørresundby (DK)

(73) Assignee: Nokia Technologies Oy, Espoo (FI)

( * ) Notice: Subject to any disclaimer, the term of this patent is extended or adjusted under 35 U.S.C. 154(b) by 490 days.

(21) Appl. No.: 17/419,328

(22) PCT Filed: Jan. 13, 2020

(86) PCT No.: PCT/FI2020/050021
§ 371 (c)(1),
(2) Date: Jun. 29, 2021

(87) PCT Pub. No.: WO2020/148483
PCT Pub. Date: Jul. 23, 2020

(65) Prior Publication Data
US 2022/0095331 A1    Mar. 24, 2022

Related U.S. Application Data

(60) Provisional application No. 62/792,396, filed on Jan. 14, 2019.

(51) Int. Cl.
*H04W 4/00*  (2018.01)
*H04L 1/1812*  (2023.01)
(Continued)

(52) U.S. Cl.
CPC ....... *H04W 72/1268* (2013.01); *H04L 1/1812* (2013.01); *H04W 8/22* (2013.01); *H04W 74/0833* (2013.01)

(58) Field of Classification Search
CPC ............... H04W 72/1268; H04W 8/22; H04W 74/0833; H04W 28/0205; H04W 72/02;
(Continued)

(56) References Cited

U.S. PATENT DOCUMENTS 11,849,445 B2 *  12/2023  Ryoo .................... H04W 76/10
2018/0139778 A1    5/2018  Chou et al.
(Continued)

FOREIGN PATENT DOCUMENTS

JP    2020-513177 A    4/2020
JP    2020-524437 A    8/2020
(Continued)

OTHER PUBLICATIONS

"3rd Generation Partnership Project; Technical Specification Group Radio Access Network; NR; NR and NG-RAN Overall Description; Stage 2 (Release 15)", 3GPP TS 38.300, V15.3.1, Oct. 2018, pp. 1-92.
(Continued)

*Primary Examiner* — Phuongchau Ba Nguyen
(74) *Attorney, Agent, or Firm* — Nokia Technologies Oy

(57) ABSTRACT

A method of transmitting data from a user equipment (UE) in a radio resource control (RRC) inactive state to a network node is described. The example method includes detecting presence of data for transmitting to the network node and determining whether the user equipment (UE) allows a mode of operation using pre-allocated resources in the RRC inactive state for user data transmission. The example method further includes transmitting the data from the user equipment (UE) to the network node in response to determining that the user equipment (UE) allows the mode of operations using pre-allocated resources in the inactive radio resource control (RRC) state for user data transmission.

15 Claims, 7 Drawing Sheets

(51) Int. Cl.
*H04W 8/22* (2009.01)
*H04W 72/1268* (2023.01)
*H04W 74/0833* (2024.01)

(58) Field of Classification Search
CPC ..... H04W 76/27; H04W 28/04; H04W 72/04; H04W 72/042; H04W 88/08; H04W 28/08; H04W 28/084; H04W 36/22; H04W 72/12; H04L 1/1812; H04L 1/1671; H04L 5/0007
See application file for complete search history.

(56) References Cited

U.S. PATENT DOCUMENTS

| | | | |
|---|---|---|---|
| 2018/0227961 A1* | 8/2018 | Mallick | H04W 72/566 |
| 2018/0295651 A1 | 10/2018 | Cao et al. | |
| 2019/0289570 A1* | 9/2019 | Kim | H04W 68/005 |
| 2021/0051593 A1* | 2/2021 | Park | H04W 74/0833 |
| 2023/0189036 A1* | 6/2023 | Koskinen | H04W 24/10 370/328 |
| 2023/0362753 A1* | 11/2023 | Balan | H04W 36/0072 |

FOREIGN PATENT DOCUMENTS

| | | |
|---|---|---|
| KR | 1020180092787 A | 8/2018 |
| WO | 2018/086600 A1 | 5/2018 |
| WO | 2018/147677 A1 | 8/2018 |
| WO | 2018/184440 A1 | 10/2018 |
| WO | 2018/232321 A2 | 12/2018 |

OTHER PUBLICATIONS

"3rd Generation Partnership Project; Technical Specification Group Radio Access Network; NR; Radio Resource Control (RRC) protocol specification (Release 15)", 3GPP TS 38.331, V15.3.0, Sep. 2018, pp. 1-445.
"3rd Generation Partnership Project; Technical Specification Group Services and System Aspects; Feasibility study on 5G message service for MIoT; Stage 1 (Release 16)", 3GPP TR 22.824, V16.0.0, Sep. 2018, pp. 1-27.
"3rd Generation Partnership Project; Technical Specification Group Radio Access Network; Study on New Radio Access Technology; Radio Interface Protocol Aspects (Release 14)", 3GPP TR 38.804, V14.0.0, Mar. 2017, pp. 1-57.
"New SID: Study on UE Power Saving in NR", 3GPP TSG RAN Meetings #80, RP-181463, CATT, Agenda : 9.1.8, Jun. 11-14, 2018, 5 pages.
"Revised SID: Study on NR Industrial Internet of Things (IoT)", 3GPP TSG RAN meeting #81, RP-182090, Agenda : 9.3.12, Nokia, Sep. 10-13, 2018, 5 pages.
"3rd Generation Partnership Project; Technical Specification Group Radio Access Network; NR; User Equipment (UE) procedures in Idle mode and RRC Inactive state (Release 15)", 3GPP TS 38.304, V15.0.0, Jun. 2018, pp. 1-25.
"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 15)", 3GPP TS 36.300, V15.3.0, Sep. 2018, pp. 1-358.
"3rd Generation Partnership Project; Technical Specification Group Radio Access Network; NR; User Equipment (UE) procedures in Idle mode and RRC Inactive state (Release 15)", 3GPP TS 38.304, V15.1.0, Sep. 2018, pp. 1-27.
International Search Report and Written Opinion received for corresponding Patent Cooperation Treaty Application No. PCT/FI2020/050021, dated Apr. 14, 2020, 14 pages.
Extended European Search Report received for corresponding European Patent Application No. 20741415.2, dated Jul. 7, 2022, 10 pages.
"Discussion on procedures related to NOMA", 3GPP TSG RAN WG1 Meeting #94bis, R1-1811486, KDDI, Agenda : 7.2.1.3, Oct. 8-12, 2018, 5 pages.
"UL data transmission in RRC Inactive", 3GPP TSG-RAN WG2 #96, R2-168544, Huawei, Agenda : 9.2.1.1, Nov. 14-18, 2016, pp. 1-8.
Office action received for corresponding Japanese Patent Application No. 2021-540501, dated May 30, 2023, 4 pages of office action and 5 pages of translation available.
Office action received for corresponding Indonesian Patent Application No. P00202105365, dated Jun. 14, 2023, 3 pages of office action and 3 pages of translation available.
Office action received for corresponding Japanese Patent Application No. 2021-540501, dated Sep. 20, 2022, 5 pages of office action and 7 pages of translation available.
"Transmission in preconfigured UL resources", 3GPP TSG RAN WG1 Meeting #95, R1-1812904, Nokia, Agenda : 6.2.1.2, Nov. 12-16, 2018, 5 pages.
"Discussion on preconfigured UL resources in MTC", 3GPP TSG RAN WG1 Meeting #95, R1-1812528, LG Electronics, Agenda : 6.2.1.2, Nov. 12-16, 2018, 9 pages.
"Discussion on Procedures Related to Non-Orthogonal Multiple Access", 3GPP TSG RAN WG1 Meeting #95, R1-1813213, InterDigital Inc, Agenda : 7.2.1.3, Nov. 12-16, 2018, pp. 1-5.

* cited by examiner

TRANSMITTING DATA FROM A USER EQUIPMENT IN RADIO RESOURCE CONTROL INACTIVE STATE

RELATED APPLICATION

This application was originally filed as PCT Application No. PCT/FI/2020/050021 on Jan. 13, 2020, which claims priority from U.S. Provisional Application No. 62/792,396, filed on Jan. 14, 2019, each of which is incorporated herein by reference in its entirety.

PRIORITY CLAIM

This application claims priority to and the benefit of U.S. Provisional Patent Application No. 62/792,396, filed Jan. 14, 2019, entitled "TRANSMITTING DATA FROM A USER EQUIPMENT IN RADIO RESOURCE CONTROL INACTIVE STATE," the disclosure of which is hereby incorporated by reference in its entirety.

TECHNICAL FIELD

This description relates to wireless communications, and in particular, to data transmissions from a user equipment (UE) in a radio resource control (RRC) inactive state.

BACKGROUND

A communication system may be a facility that enables communication between two or more nodes or devices, such as fixed or mobile communication devices. Signals can be carried on wired or wireless carriers.

An example of a cellular communication system is an architecture that is being standardized by the 3rd Generation Partnership Project (3GPP). A recent development in this field is often referred to as the long-term evolution (LTE) of the Universal Mobile Telecommunications System (UMTS) radio-access technology. E-UTRA (evolved UMTS Terrestrial Radio Access) is the air interface of 3GPP's Long Term Evolution (LTE) upgrade path for mobile networks. In LTE, base stations or access points (APs), which are referred to as enhanced Node AP or Evolved Node B (eNBs), provide wireless access within a coverage area or cell. In LTE, mobile devices, or mobile stations are referred to as a user equipment (UE). LTE has included a number of improvements or developments.

5G New Radio (NR) development is part of a continued mobile broadband evolution process to meet the requirements of 5G, similar to earlier evolution of 3G & 4G wireless networks. In addition, 5G is also targeted at the new emerging use cases in addition to mobile broadband. A goal of 5G is to provide significant improvement in wireless performance, which may include new levels of data rate, latency, reliability, and security. 5G NR may also scale to efficiently connect the massive Internet of Things (IoT), and may offer new types of mission-critical services. Ultra-reliable and low-latency communications (URLLC) devices may require high reliability and very low latency.

SUMMARY

A method, apparatus, and a computer-readable storage medium are provided for transmitting data from a user equipment (UE) in a radio resource control (RRC) inactive state to a network node.

In some implementations, the method may include detecting presence of data for transmitting to the network node and determining whether the user equipment (UE) allows a mode of operation using pre-allocated resources in the RRC inactive state for user data transmission. The example method further includes transmitting the data from the user equipment (UE) to the network node in response to determining that the user equipment (UE) allows the mode of operations using pre-allocated resources in the inactive radio resource control (RRC) state for user data transmission.

DETAILED DESCRIPTION

Figure 1:
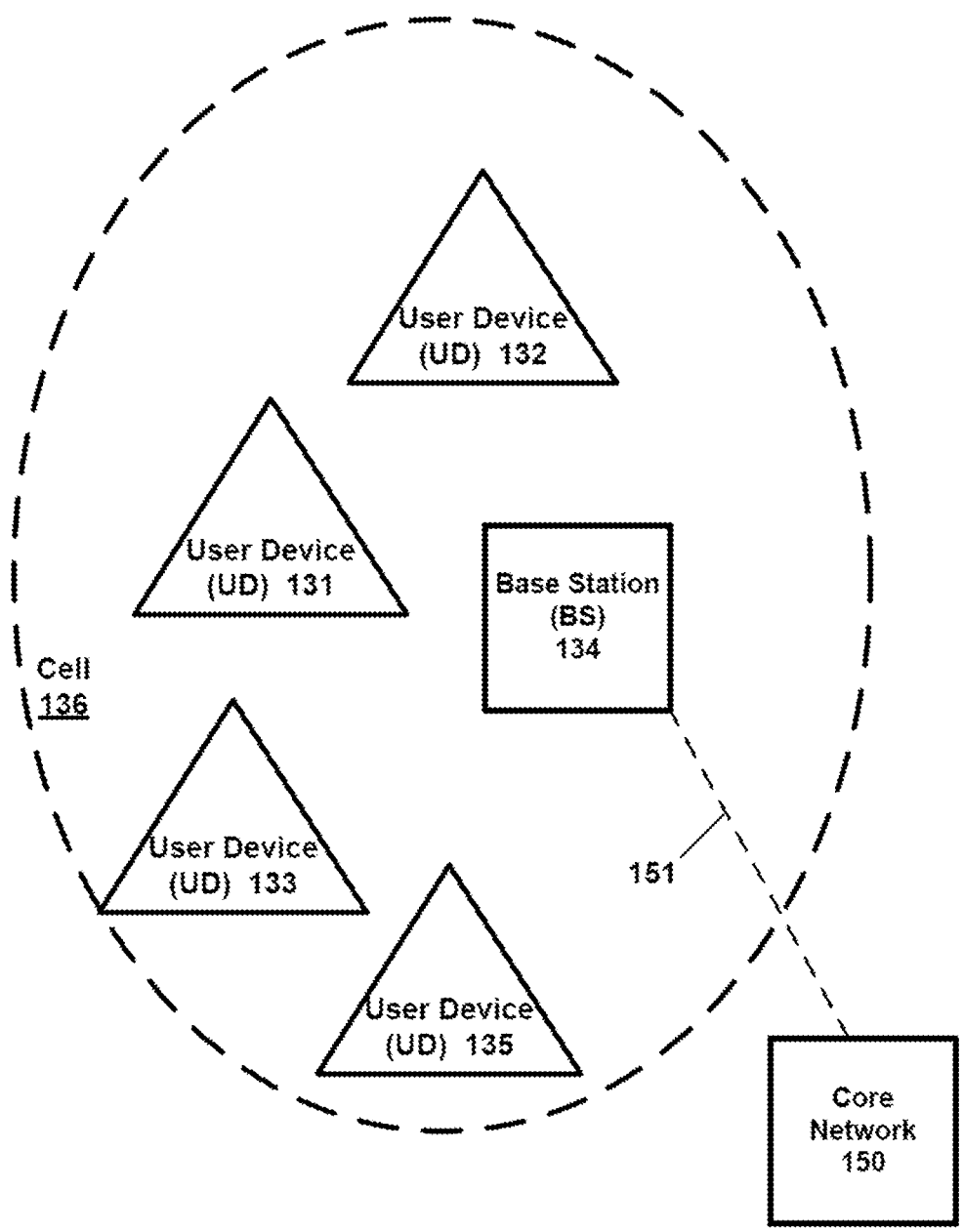
FIG. 1 is a block diagram of a wireless network according to an example implementation.

FIG. 1 is a block diagram of a wireless network 130 according to an example implementation. In the wireless network 130 of FIG. 1, user devices (UDs) 131, 132, 133 and 135, which may also be referred to as mobile stations (MSs) or user equipment (UEs), may be connected (and in communication) with a base station (BS) 134, which may also be referred to as an access point (AP), an enhanced Node B (eNB) or a network node. At least part of the functionalities of an access point (AP), base station (BS) or (e)Node B (eNB) may also be carried out by any node, server or host which may be operably coupled to a transceiver, such as a remote radio head. BS (or AP) 134 provides wireless coverage within a cell 136, including to user devices 131, 132, 133 and 135. Although only four user devices are shown as being connected or attached to BS 134, any number of user devices may be provided. BS 134 is also connected to a core network 150 via a Si interface 151. This is merely one simple example of a wireless network, and others may be used.

A user device (user terminal, user equipment (UE)) may refer to a portable computing device that includes wireless mobile communication devices operating with or without a subscriber identification module (SIM), including, but not limited to, the following types of devices: a mobile station (MS), a mobile phone, a cell phone, a smartphone, a personal digital assistant (PDA), a handset, a device using a wireless modem (alarm or measurement device, etc.), a laptop and/or touch screen computer, a tablet, a phablet, a game console, a notebook, and a multimedia device, as examples, or any other wireless device. It should be appreciated that a user device may also be a nearly exclusive uplink only device, of which an example is a camera or video camera loading images or video clips to a network.

In LTE (as an example), core network 150 may be referred to as Evolved Packet Core (EPC), which may include a mobility management entity (MME) which may handle or assist with mobility/handover of user devices between BSs, one or more gateways that may forward data and control signals between the BSs and packet data networks or the Internet, and other control functions or blocks.

In addition, by way of illustrative example, the various example implementations or techniques described herein may be applied to various types of user devices or data service types, or may apply to user devices that may have multiple applications running thereon that may be of different data service types. New Radio (5G) development may support a number of different applications or a number of different data service types, such as for example: machine type communications (MTC), enhanced machine type communication (eMTC), Internet of Things (IoT), and/or narrowband IoT user devices, enhanced mobile broadband (eMBB), and ultra-reliable and low-latency communications (URLLC).

IoT may refer to an ever-growing group of objects that may have Internet or network connectivity, so that these objects may send information to and receive information from other network devices.

For example, many sensor type applications or devices may monitor a physical condition or a status, and may send a report to a server or other network device, e.g., when an event occurs. Machine Type Communications (MTC or machine to machine communications) may, for example, be characterized by fully automatic data generation, exchange, processing and actuation among intelligent machines, with or without intervention of humans. Enhanced mobile broadband (eMBB) may support much higher data rates than currently available in LTE.

Ultra-reliable and low-latency communications (URLLC) is a new data service type, or new usage scenario, which may be supported for New Radio (5G) systems. This enables emerging new applications and services, such as industrial automations, autonomous driving, vehicular safety, e-health services, and so on. 3GPP targets in providing up to e.g. 1 ms U-Plane (user/data plane) latency connectivity with 1-1e-5 reliability, by way of an illustrative example. Thus, for example, URLLC user devices/UEs may require a significantly lower block error rate than other types of user devices/UEs as well as low latency. Thus, for example, a URLLC UE (or URLLC application on a UE) may require much shorter latency, as compared to an eMBB UE (or an eMBB application running on a UE).

The various example implementations may be applied to a wide variety of wireless technologies or wireless networks, such as LTE, LTE-A, 5G, IoT, MTC, eMTC, eMBB, URLLC, etc., or any other wireless network or wireless technology. These example networks, technologies or data service types are provided only as illustrative examples.

Multiple Input, Multiple Output (MIMO) may refer to a technique for increasing the capacity of a radio link using multiple transmit and receive antennas to exploit multipath propagation. MIMO may include the use of multiple antennas at the transmitter and/or the receiver. MIMO may include a multi-dimensional approach that transmits and receives two or more unique data streams through one radio channel. For example, MIMO may refer to a technique for sending and receiving more than one data signal simultaneously over the same radio channel by exploiting multipath propagation. According to an illustrative example, multi-user multiple input, multiple output (multi-user MIMIO, or MU-MIMO) enhances MIMO technology by allowing a base station (BS) or other wireless node to simultaneously transmit or receive multiple streams to different user devices or UEs, which may include simultaneously transmitting a first stream to a first UE, and a second stream to a second UE, via a same (or common or shared) set of physical resource blocks (PRBs) (e.g., where each PRB may include a set of time-frequency resources).

Also, a BS may use precoding to transmit data to a UE (based on a precoder matrix or precoder vector for the UE). For example, a UE may receive reference signals or pilot signals, and may determine a quantized version of a DL channel estimate, and then provide the BS with an indication of the quantized DL channel estimate. The BS may determine a precoder matrix based on the quantized channel estimate, where the precoder matrix may be used to focus or direct transmitted signal energy in the best channel direction for the UE. Also, each UE may use a decoder matrix may be determined, e.g., where the UE may receive reference signals from the BS, determine a channel estimate of the DL channel, and then determine a decoder matrix for the DL channel based on the DL channel estimate. For example, a precoder matrix may indicate antenna weights (e.g., an amplitude/gain and phase for each weight) to be applied to an antenna array of a transmitting wireless device. Likewise, a decoder matrix may indicate antenna weights (e.g., an amplitude/gain and phase for each weight) to be applied to an antenna array of a receiving wireless device. This applies to UL as well when a UE is transmitting data to a BS.

For example, according to an example aspect, a receiving wireless user device may determine a precoder matrix using Interference Rejection Combining (IRC) in which the user device may receive reference signals (or other signals) from a number of BSs (e.g., and may measure a signal strength, signal power, or other signal parameter for a signal received from each BS), and may generate a decoder matrix that may suppress or reduce signals from one or more interferers (or interfering cells or BSs), e.g., by providing a null (or very low antenna gain) in the direction of the interfering signal, in order to increase a signal-to interference plus noise ratio (SINR) of a desired signal. In order to reduce the overall interference from a number of different interferers, a receiver may use, for example, a Linear Minimum Mean Square Error Interference Rejection Combining (LMMSE-IRC) receiver to determine a decoding matrix. The IRC receiver and LMMSE-IRC receiver are merely examples, and other types of receivers or techniques may be used to determine a decoder matrix. After the decoder matrix has been determined, the receiving UE/user device may apply antenna weights (e.g., each antenna weight including amplitude and phase) to a plurality of antennas at the receiving UE or device based on the decoder matrix. Similarly, a precoder matrix may include antenna weights that may be applied to antennas of a transmitting wireless device or node. This applies to a receiving BS as well.

In wireless communications, the radio resource control (RRC) protocol is used on the air interface for control purposes. In 3GPP Rel-15, an independent radio resource control (RRC) state referred to as RRC_INACTIVE state (or RRC Connected Inactive state, inactive RRC state, etc.) is introduced to complement the existing RRC states (RRC_CONNECTED and RRC_IDLE) to increase efficiency (e.g., in terms of signaling, latency, energy use, etc.) for e.g. massive Machine Type Communications (mMTC)/massive Internet of Things (mIoT) services.

The RRC_INACTIVE state is expected to support transmission of small amounts of data or sporadic data from a user equipment (UE) with lower delay when compared with a UE in RRC_IDLE state. In addition, in the RRC_INACTIVE state, the UE can move autonomously (e.g., transparent to the radio access network (RAN)) within the RAN Notification area (RNA) within which the UE can be paged from the RAN rather than from the core network. When the UE leaves the assigned RNA, an RNA Update procedure (RNAU) is performed. However, the core network may not be aware of whether the UE is in RRC_CONNECTED or RRC_INACTIVE state.

The present disclosure provides a simple and efficient procedure to transmit data from a UE when the UE is in an inactive RRC state (e.g. RRC_INACTIVE state). In some implementations, the proposed procedure eliminates the need for performing a random access (RA) channel procedure for UEs in an inactive RRC state when the UEs have data to transmit. In other words, time alignment (TA), a part of the RA procedure, may not be performed. This may also provide a way to handle potential random access (RA) preamble bottlenecks used for UE identification, by using configured grant (CG) operations to transmit data (e.g., small amounts of data) in the uplink.

For example, in one implementation, the method may include detecting presence of data for transmitting to a network node, determining whether the user equipment (UE) allows configured grant (CG) mode operations in the RRC inactive state, and transmitting the data from the user equipment (UE) to the network node in response to determining that the user equipment (UE) allows the configured grant (CG) mode operations.

Figure 2:
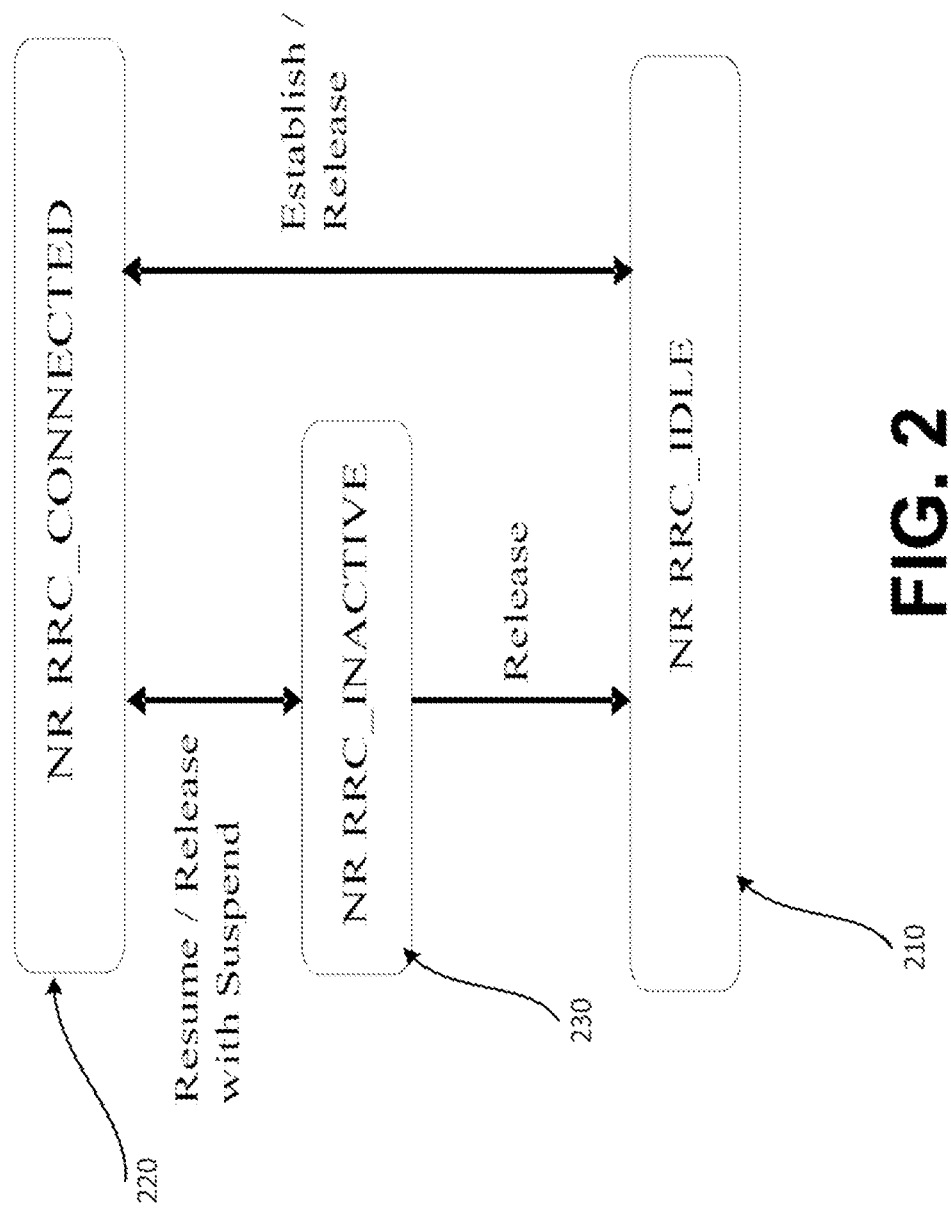
FIG. 2 is a diagram illustrating example radio resource control (RRC) state transitions in 5G/NR.

FIG. 2 is a diagram illustrating example radio resource control (RRC) state transitions in 5G/NR.

In wireless communications, the radio resource control (RRC) protocol is used on the air interface for control purposes. The major functions of the RRC protocol include, for example, connection establishment and release, broadcast of system information, radio bearer establishment, reconfiguration and release, RRC connection mobility procedures, paging notification and release, and outer loop power control. The RRC operations are guided by a state machine illustrated in FIG. 2 which defines certain specific RRC states that a UE may be present in.

In 5G/NR, the following RRC states are supported—RRC_IDLE 210, RRC_CONNECTED 220, and RRC_INACTIVE 230. The RRC_INACTIVE state 230 is a new RRC state introduced in 5G/NR.

When a UE is powered up, the UE is in RRC_IDLE state 210. The UE transitions to RRC_CONNECTED state 220 with initial attach or with connection establishment. If there is no activity from the UE for a short time, the network can suspend the UE's RRC connection and instruct the UE to transition to RRC_INACTIVE state 230, to save power consumption and/or resources, and can request the UE to resume its session, as needed, by transitioning to RRC_CONNECTED state 220. In some implementations, the RRC_INACTIVE state may also be referred to as an RRC state that is different from an RRC active and/or RRC idle states; or an inactive RRC state; or a non-active RRC state.

Figure 3:
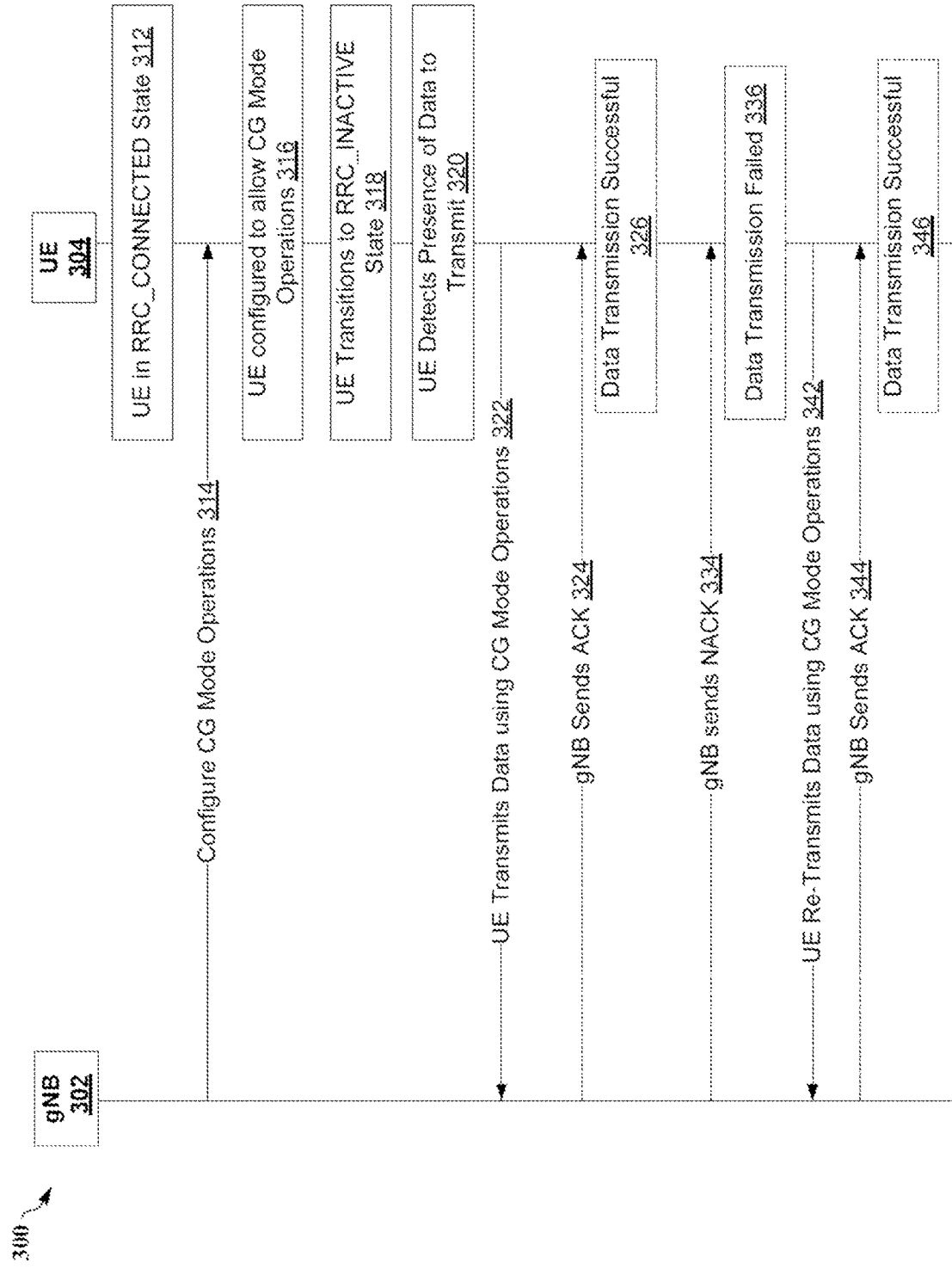
FIG. 3 is a message flow diagram illustrating transmission of data from a UE to a network node, according to one example implementation.

FIG. 3 is a message flow diagram 300 illustrating transmission of data from a UE to a network node (e.g., next generation NB, gNB), according to one example implementation.

At 312, a UE (e.g., UE 304) may be in an RRC_CONNECTED state (e.g., RRC_CONNECTED state 220). At 314, when UE 304 is in the RRC_CONNECTED state, gNB 302 may configure configured grant (CG) mode operations (also referred to as CG mode or mode of operations using pre-allocated resources in the inactive radio resource control (RRC) state) at UE 304. The CG mode operations may be configured, for example, when the UE is in an RRC_CONNECTED state or at RRC connection suspend, and the CG mode operations may be activated/deactivated, as needed (for example, upon transition to RRC_INACTIVE state). In Rel-15, for CG mode operations Type-1, the resource configuration and activation/deactivation may be provided via RRC protocol signalling; and for CG mode operations Type-2, the resource configuration is provided via RRC and the activation/deactivation may be provided via a physical downlink control channel (PDCCH) addressed to configured scheduling (CS)-radio network temporary identifier (RNTI). In some implementations, the CG mode operations allow UE 304 to transmit data to gNB 302 while remaining in the RRC_INACTIVE state. For example, when UE 304 is configured to allow CG mode operations, UE 304 can transmit data on the uplink to gNB 302 without transitioning to RRC_CONNECTED state (or without initiating RA, e.g. 4-step RA procedure or enhanced RA procedure, e.g., 2-step RA procedure. The transmitting of data from UE 304 in RRC_INACTIVE state reduces the amount of signalling data generated in the network and conserves power resources (e.g., battery power) at UE 304.

In some implementations, the CG mode operations may be configured at UE 304 based on (or via) an indication received from gNB 302 via a system information block (SIB), a radio resource control (RRC), or a downlink control indicator (DCI) message. At 316, UE 304 is configured to allow CG mode operations based on (or via) the indication received from gNB 302 at 314.

At 318, UE 304 may be transitioned to RRC_INACTIVE state (e.g., RRC_INACTIVE state 230), for example, by the network node (e.g., gNB 302) by having its RRC connection suspended if there is no data activity for a certain period. The UE may continue to remain in RRC_INACTIVE state until, for example, data is available to transmit to gNB 302. At 320, when UE 302 is in an RRC_INACTIVE state, UE 304 may detect the presence of data for transmitting on the uplink to gNB 302. In some implementations, the data for transmission to gNB 302 may be present in a transmission buffer at the UE. For example, the buffer at UE 304 may be a packet data convergence protocol (PDCP), a radio link control (RLC), or a media access control (MAC) buffer. In some implementations, a threshold value (e.g., number of bits in the buffer, buffer occupancy percentage, etc.) may be used to trigger determining whether data is present in the buffer for transmission. For example, UE 304 may detect the presence of data for transmitting on the uplink based on a threshold value which may be configured based on the application and/or QoS requirements. In addition, in some implementations, a threshold value (same or different from the threshold above described above) may be used to determine whether to allow CG mode operations.

At 322, UE 304 may transmit the data to gNB 302 using CG mode operations. In some implementations, UE 304 may determine whether the UE is configured to allow CG mode operations (for example, whether CG mode operations is allowed and/or activated as described above) prior to transmitting the data to gNB 302 using CG mode operations in the RRC_INACTIVE state.

In some implementations, a gNB (e.g., gNB 302) may broadcast instructions to UEs in RRC_CONNECTED and/or RRC_INACTIVE on whether they are allowed to use configured grants (CG) associated with CG mode operations in RRC_INACTIVE state and/or information on dedicated time/frequency resources and associated reference signals (e.g., demodulation reference signal (DMRS) sequences). In some implementations, this may allow a UE in RRC_INACTIVE state to benefit from CG mode operations in mobility scenarios as well, e.g., upon cell change(s) within the radio access network (RAN)-based notification area (RNA). In addition, in some implementations, the gNB may send UE-specific configuration upon the UE moving to RRC_INACTIVE state or while the UE is in INACTIVE state, e.g. during RNAU procedure.

In some implementations, at 324, gNB 302, upon reception of the data transmitted from UE 304, may transmit an ACK (e.g., a hybrid automatic repeat request (HARQ) acknowledgement) to UE 304 upon successful decoding of the data (e.g., user data) transmitted from UE 304 at 322. At 326, UE 304 may consider the data transmission to gNB 302 successful upon receiving of the ACK from gNB 302.

However, in some implementations, at 334, gNB 302 may transmit a NACK (e.g., a HARQ negative acknowledgement) to UE 304 or no ACK/NACK is received from gNB 302. The gNB 302 may transmit a NACK when the decoding of the data fails at gNB 302. The decoding may fail if, for example, gNB 302 fails to successfully decode a reference signal (e.g., a demodulation reference signal (DMRS) sequence) or an uplink data channel (e.g., a physical uplink shared channel (PUSCH)) associated with the data transmitted from UE 304. In some implementations, a network node (e.g., gNB 302 may send an indication of a NACK, for example, a DCI or other indication, which may indicate the fallback procedure the UE should use. At 336, UE 304 may consider the data transmission to gNB 302 unsuccessful (e.g., data transmission failed) upon receiving of the NACK (or not receiving ACK/NACK).

In some implementations, for example, if gNB decodes only the DMRS sequence used for the transmission, but not the data transmission (user/data plane), the gNB may notify any UE which could have used the given DMRS (e.g., any RRC_INACTIVE UE configured with that pool) to indicate the subsequent UE action. For example, the UE action could be that the intended UE(s) should retry with a different DMRS sequence from the pool. Alternatively, the gNB could send a dedicated DMRS sequence to use for the subsequent re-transmission to reduce latency.

At 342, UE 304 may re-transmit the data using CG mode operations. In some implementations, UE 304 may determine whether the UE is configured to re-transmit data using CG mode operations prior to re-transmitting the data to gNB 302 using the CG mode operations (e.g., as configuration of CG mode operations may change) or due to mobility of the UE. At 344, gNB 302 may transmit an ACK (e.g., an acknowledgement) to UE 304 upon successful decoding of the data re-transmitted from UE 304 at 342. At 346, UE 304 may consider the data re-transmission to gNB 302 successful upon reception of the ACK.

In some implementations, gNB 302 may configure the number of transmission attempts using CG mode operations UE 304 is allowed before triggering other procedures to transmit data, for example, to avoid an end-less loop, longer delays, etc.

Thus, a UE in an RRC_INACTIVE state may continue to remain in RRC_INACTIVE state and transmit data in the uplink to a gNB using CG mode operations to improve network performance (e.g., reduced signalling) and/or conserve power/resources (e.g., UE battery power, RA channel preambles, etc.).

Figure 4:
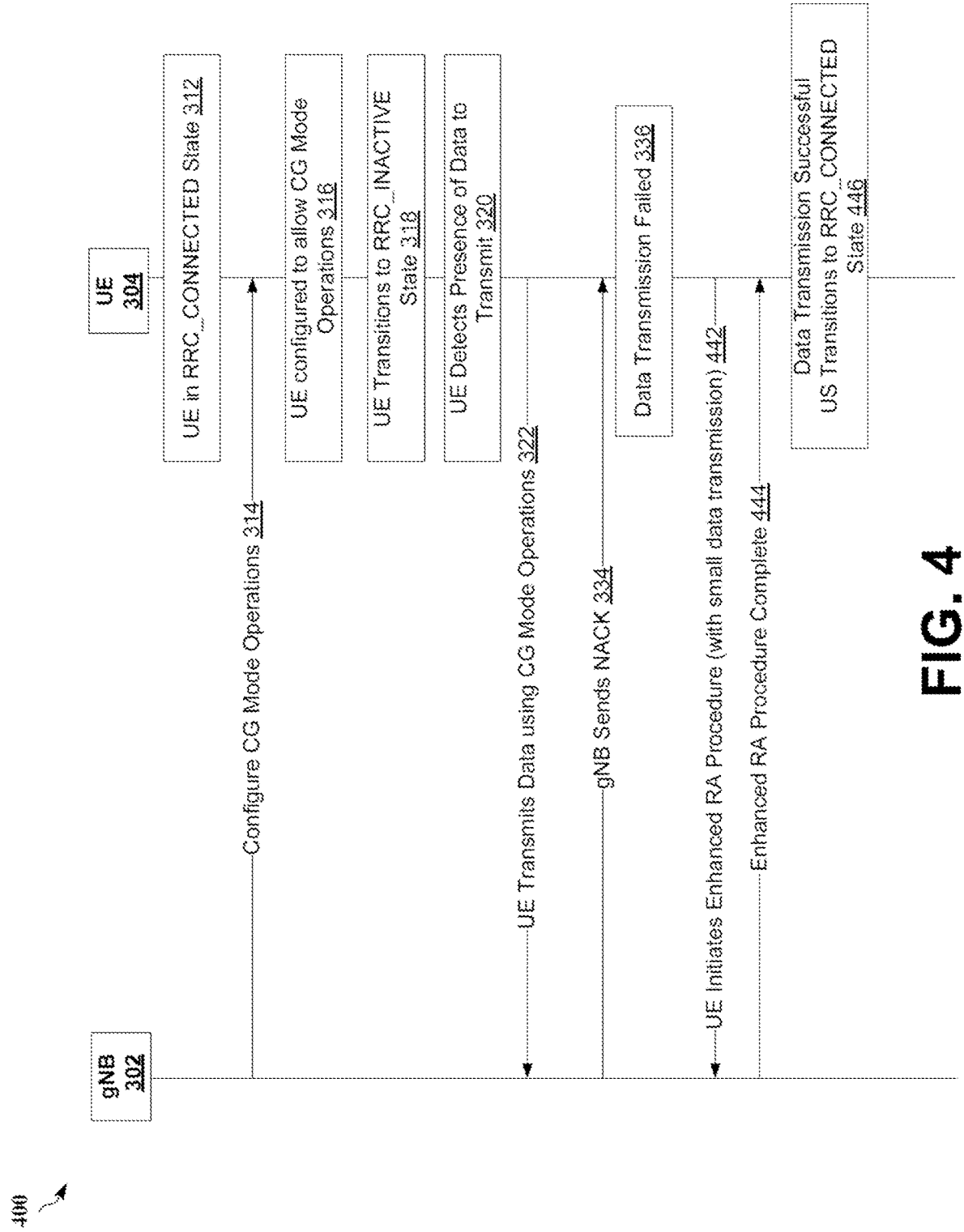
FIG. 4 is a message flow diagram illustrating transmission of data from a UE to a network node, according to an additional example implementation.

FIG. 4 is a message flow diagram 400 illustrating transmitting of data from a UE to a network node, according to an additional example implementation.

In some implementations, for example, the operations at 312, 314, 316, 318, 320, 322, 334, and 336 of FIG. 4 may be the same or similar to operations 312, 314, 316, 318, 320, 322, 334, and 336, respectively, of FIG. 3.

At 442, UE 304 may try to re-transmit the data by initiating an enhanced random access (RA) procedure, e.g., enhanced RACH procedure (e.g., referred to as small data transmission and defined in 3GPP TR 38.304; referred to as early data transmission and defined in 3GPP TS 36.300 V15.3.0, Section 7.3b). This procedure allows the UE to transmit the uplink user plane data after the RA response, the transmission is performed in the message 3 (MSG3) of the procedure. The (non-enhanced) RACH procedure, in general, may include the following: 1) MSG1: sending a random access preamble; 2) MSG2: receiving a random access response; 3) MSG3: transmitting an RRC connection setup or resume request; and 4) MSG4: receiving an RRC connection or resume response, and 5) MSG5: transmitting an RRC connection setup or resume complete. In the enhanced RACH procedure, a UE may send small data transmissions with/after message 3 of the RA procedure.

In some implementations, for example, UE 304 may re-transmit the data (whose transmission failed in an earlier attempt) as part of step 3 of the enhanced RA channel procedure. UE 304 may initiate enhanced RA channel procedure based on information received from gNB 302. In some implementations, for example, this procedure (e.g., transmit using CG mode operations in RRC_INACTIVE state followed by enhanced RA procedure) may be used for transmitting data that is sensitive to delay and/or power consumption constraints.

At 444, gNB 302 may transmit confirmation regarding the transition of UE 304 to RRC_CONNECTED state. At 446, UE 304 may transition to RRC_CONNECTED state and mark the data transmission as successful based on an indication from the gNB.

In some implementations, gNB 302 may configure the number of transmission/re-transmission attempts using CG mode operations UE 304 is allowed before triggering the enhanced RA procedure to transmit data. Thus, data may be transmitted from a UE to gNB using a combination of CG mode operations and enhanced RA procedure to improve network performance and/or conserve UE power consumption.

Figure 5:
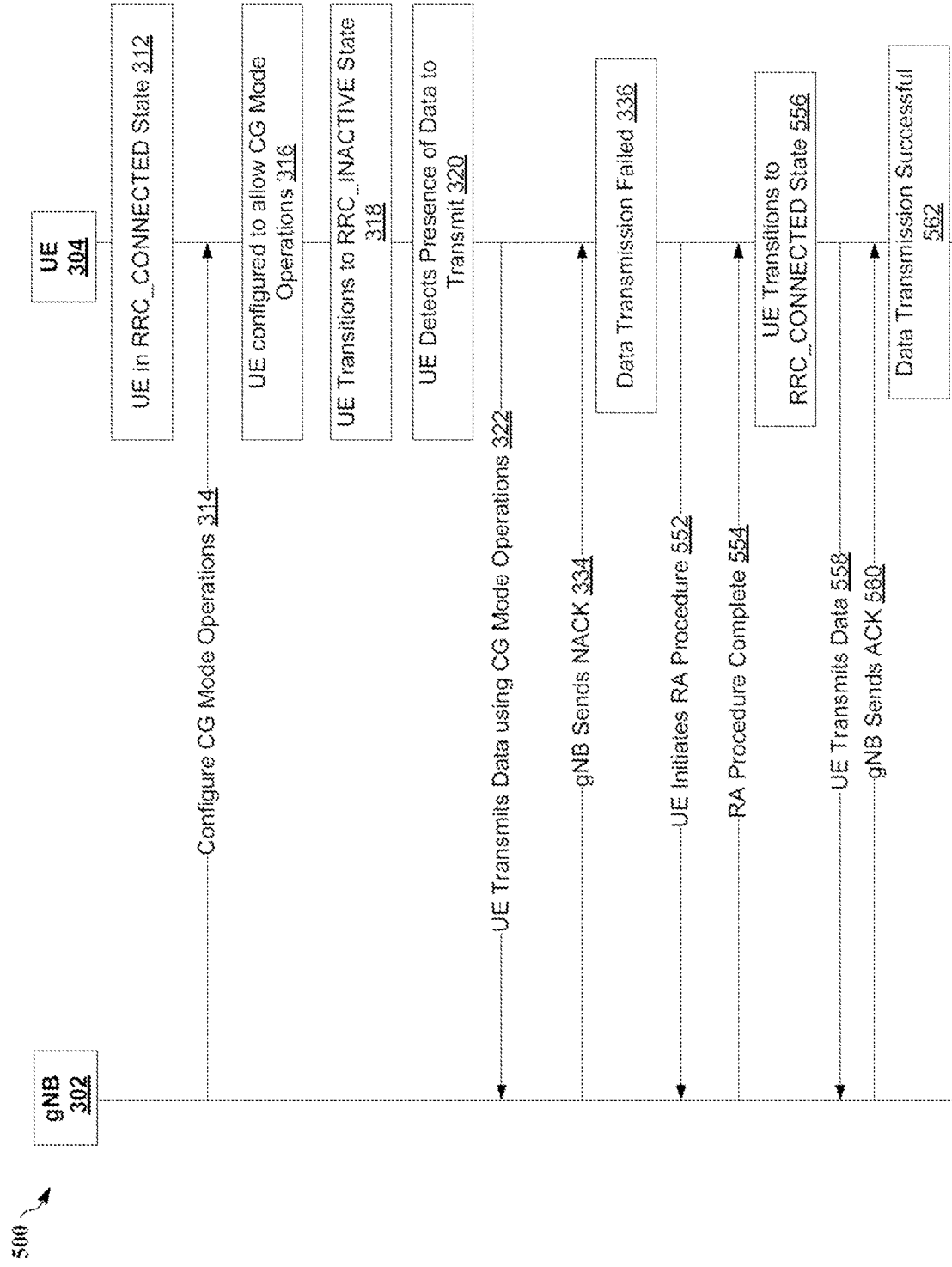
FIG. 5 is a message flow diagram illustrating transmission of data from a UE to a network node, according to another additional example implementation.

FIG. 5 is a message flow diagram 500 illustrating transmitting of data from a UE to a network node, according to another additional example implementation.

In some implementations, the operations at 312, 314, 316, 318, 320, 322, 334, and 336 of FIG. 5 may be the same or similar to operations 312, 314, 316, 318, 320, 322, 334, and 336, respectively, of FIG. 3.

At 552, UE 304 may try to re-transmit data by initiating a RA procedure. The UE may initiate the RA procedure to synchronize the UE with the network (e.g., gNB 302) and transition the UE to an RRC_CONNECTED state to transmit data to gNB 302. At 544, gNB 302 may transmit a confirmation to UE 304 regarding the completion of the RA procedure and UE 304, at 556, may transition to RRC_CONNECTED state.

At 558, UE 304 may transmit data to gNB 304. In some implementations, at 560, gNB 302 may transmit an ACK (e.g., an acknowledgement) to UE 304 upon successful decoding of the data transmitted from UE 304 at 558. At 562, UE 304 may consider the data transmission to the gNB 302 successful upon receiving of the ACK. In some implementations, in case of a NACK, normal HARQ retransmission procedures can be used.

Thus, data may be transmitted from a UE to a gNB using a combination of CG mode operations and RA procedure to improve network performance and/or conserve UE power.

Figure 6:
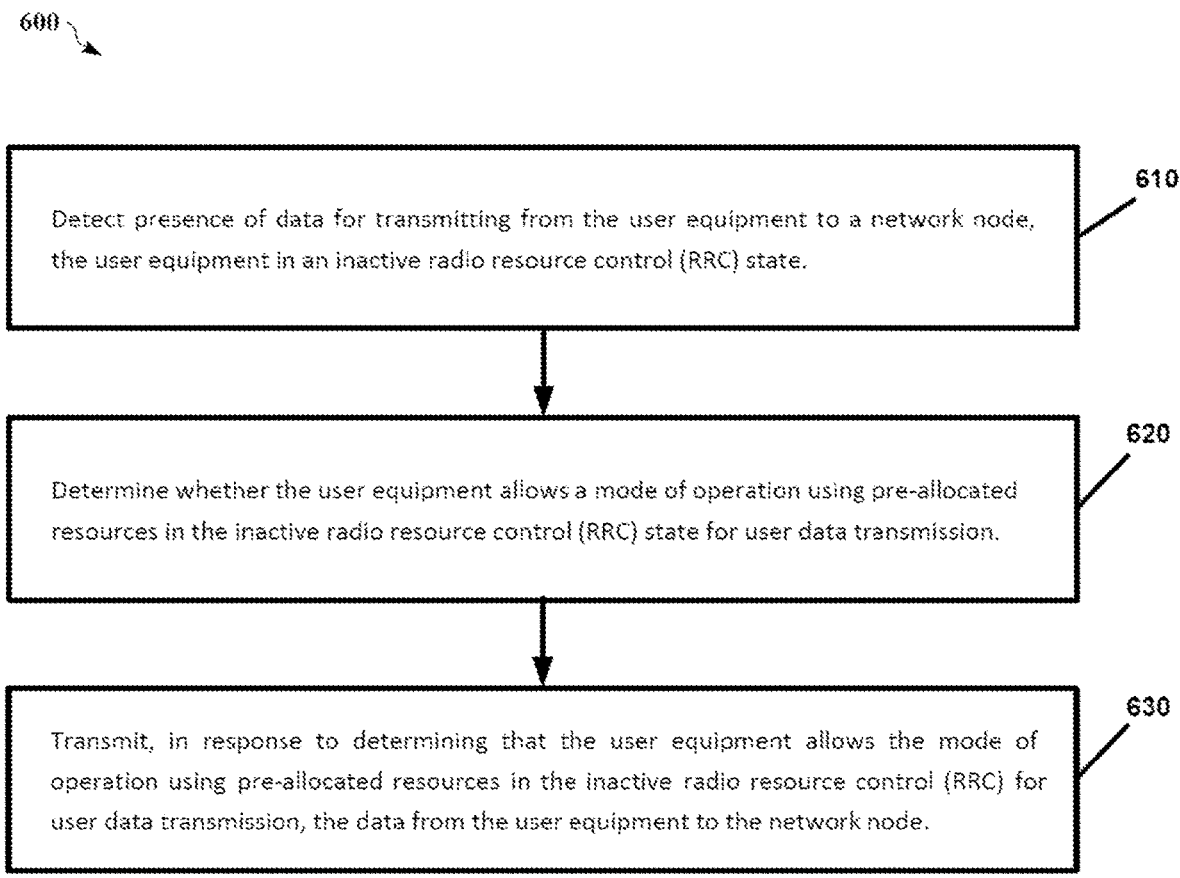
FIG. 6 is a flow chart illustrating data transmission from a user equipment, according to an example implementation.

FIG. 6 is a flow chart 600 illustrating transmitting of data from a user equipment (UE), for example, in an RRC_I-NACTIVE state, according to at least one example implementation.

At block 610, a UE may detect presence of data for transmitting from the UE to a network node when the UE is in an RRC_INACTIVE state. For example, in some implementations, a UE (e.g., UE 304) may be in an RRC_INACTIVE state and detect the presence of data (e.g., user data) in a buffer at the UE.

At block 620, the UE may determine whether the UE allows CG mode operations in the RRC_INACTIVE state to transmit the data. For example, in some implementations, UE 304 may determine whether to use CG mode operations to transmit the data in response to detecting the presence of data for transmitting from UE 304.

In some implementations, gNB 302 may configure UE 304 to allow CG mode operations in RRC_INACTIVE state. The gNB 302 may configure UE 304 to allow data transmissions using CG mode operations in RRC_INACTIVE state based on some criteria. In an example implementation, the criteria may include one or more of: traffic load, measured collision rate per access mode, QoS targets (e.g., user-plane/control-plane latency), UE traffic patterns, UE mobility level, etc.

UE 304 may receive the configuration of CG mode operations via an indication (e.g., a message, attribute, etc.) from gNB 302. In some implementations, UE 304 may receive the indication via a system information block (SIB), a radio resource control (RRC), or a downlink control indicator (DCI) message received from gNB 302 when the UE is in an RRC_CONNECTED state or at RRC transition from RRC_CONNECTED to RRC_INACTIVE state. In some implementations, gNB 302 may change the configuration of CG mode operations (e.g., configuration and/or activation/deactivation of CG mode operations) at the UE on a dynamic basis, for example, valid for a given amount of time (e.g., valid for X minutes), available battery power at the UE, etc. In an example implementation, gNB 302 may provide an indication to UE 304, via a broadcast message (e.g., SIB, DCI, RRC, etc.), regarding whether the UE is allowed to use CG mode operations.

However, if UE 304 (for example, when located in the cell coverage area of gNB 302) is not configured to allow CG mode operations in the RRC_INACTIVE state, UE 304 may follow 5G/NR RRC state transitions (as illustrated in FIG. 2) and may transition to RRC_CONNECTED state for transmitting the data or try to transmit small amounts of data during enhanced RA procedure (e.g., step 3 of the enhanced RA procedure as described above and defined in 3GPP specifications).

In some implementations, when UE 304 determines that the UE is configured to allow CG mode operations in RRC_INACTIVE state, UE 304 may select resources for transmitting the data from a pool of resources. The resources may include time-frequency resources (e.g., physical resource blocks (PRBs)), a demodulation reference signal (DMRS) sequence, etc. In some implementations, gNB 302, when indicating the UE about the configuration of CG mode operations in RRC_INACTIVE state, may also notify the UE about the resource pools from which the UE can select the resources. The resource pools may be reserved by gNB 302 for CG mode operations in RRC_INACTIVE state to allow UEs transmitting data when they are in RRC_INACTIVE state.

The resource pools may include, for example, pools of time-frequency resources and/or DMRS sequences from which UE 304 may select the required resources for transmitting the data. In some implementations, UE 304 may select time-frequency resources (e.g., from a pool of PRBs) and/or a DMRS sequence (e.g., from a pool of DMRS sequences) for transmitting the data to gNB 302. The resources may be selected in various ways. For example, in some implementations, the resources may be selected in a pseudo-random manner. In some implementations, the resources may be selected based on instruction(s) (e.g., rules that may be pre-defined/pre-configured) from gNB 302. In an example implementation, UE 304 may select the pool(s) of resources and select a sub-set of resources from the selected pool(s). In another example implementation, gNB 302 may instruct UE 304 to use different pools or a different sub-set from the same pool(s), for instance, different from resources used in the earlier CG mode operations that failed.

For example, a UE may select resources based on, for example, rule(s) from the network node that indicates (or instructs) how the UE should select the resources (select a specific DMRS sequence and/or time-frequency resources); select a DMRS sequence and/or time-frequency resources based on UE's I-RNTI (e.g., the determining of the UE specific resources according to the UE identifier may be assumed to be similar to the determining of paging occasions and paging frame, as defined in 3GPP TS 38.304 V15.1.0, Section, 7); select resources of certain parts of resource pools based on the group the UE belongs (the rule may indicate the association between a UE group and parts of the resource pools); select resources based on a periodicity indicated in the rules which defines the periodicity with which the UE can use the configured grant resources, the amount of time/frequency resources (e.g., number of PRBs, etc.); selecting re-transmission approach (e.g., using CG mode operations in RRC_INACTIVE state, initiating enhanced RA procedure, initiating RA procedure, etc.).

In some implementations, for example, the network node (e.g., gNB 302) may: determine and maintain the pool of CG mode resources for RRC_INACTIVE UEs and may limit the size of the resource pools to be used by INACTIVE UEs to maximize resource utilization (e.g., orthogonalization of the resources); adjust the pool sizes based on, e.g., actual collision rate, load, antenna configuration, keeping the complexity for blind decoding attempts manageable, etc.; and/or traffic-match the time-frequency resources allocated according to UE traffic patterns (e.g., regular UE traffic patterns).

For example, in some implementations, a gNB (e.g., gNB 302) may configure the UEs (e.g., UE 304) with low traffic generation rate (e.g., knowledge based on e.g., information received by the core network or from the UE in terms of e.g. application type, QoS targets (user-plane/control-plane latency), UE traffic profile/pattern, or local history) to be primarily (mostly) in RRC_INACTIVE state (e.g., by setting a shorter RRC suspend timer, at the expiration of which the network instructs the UE to transition to RRC_INACTIVE state by issuing a RRC suspend message). In an example implementation, if energy efficiency is prioritized for a UE (e.g., based on either UE request for energy reduction or core network indication) that generates sporadic small packets or RA signalling overhead is desired to be reduced (e.g. a RA signalling target can be set locally at the gNB), gNB may configure the UEs that generates sporadic small packets with CG mode resources, including DMRS pool, through RRC signalling. In an example implementation, the gNB may configure the rules for these UEs through RRC signalling to use primarily the CG mode operations when a packet arrives while the UE is in RRC_INACTIVE state (to exploit it to e.g. avoiding increasing the RA signalling). In another example implementation, the gNB may configure a fall back mode behavior upon a NACK over the feedback channel, i.e., retry a number of times and switch to RA (or enhanced RA) procedure. In another example implementation, gNB may receive and acknowledge transmissions from UEs transmitting using CG mode resources while in the RRC_INACTIVE state.

In some implementations, gNB may respond with NACK(s) for detected transmissions that were not correctly received, potentially switching the corresponding UE to fall back mode. NACK can be explicit or implicit. When the NACK is not explicit, but implicit, no ACK/NACK is sent by the network as the network may have failed decoding. For instance, in some implementations, gNB may use a procedure (e.g., an algorithm) to assign access modes to new/existing UEs as well as to optimize the CG mode resources for CG mode operations, where input parameters may include one or more of: the information received from UE/CN (e.g. QoS targets (e.g. user-plane/control-plane latency), UE traffic pattern, UE mobility level), input parameters determined locally by monitoring the load and failure rate of transmissions (e.g., based on measurements of these metrics and evaluation against some corresponding thresholds), and parameters that include the UE and the receiver capability (e.g., in terms of the receiver type, the number of antennas, spatial diversity of the environment, etc.).

In an example implementation, the output of the algorithm may include, for example, if threshold(s) are not exceeded, then the primary access mode is CG mode for a UE in RRC_INACTIVE. If any threshold(s) are exceeded, fall back mode is assigned for a UE in RRC_INACTIVE state. For example, if failure rate threshold is exceeded (transmission failure rate for CG mode transmissions or the number of simultaneous transmissions over the CG-based access is higher than the supported for a certain receiver capability), gNB offloads the CG mode resources/DMRS pool by either reconfiguring the CG mode resources/DMRS pool or reconfiguring some UEs to either perform RA procedure instead of using the CG mode while in RRC_INACTIVE state.

At block 630, the user equipment may transmit the data from the UE to the network node in response to determining that the UE allows CG mode operations in RRC_INACTIVE state. For example, in some implementations, UE 304, in response to determining that the UE supports CG mode operations in RRC_INACTIVE state, may transmit the data (e.g., data (or portions of the data) present in the buffer) to gNB 302 while continuing to remain in RRC_INACTIVE state and using the resources selected from the resource pools described above.

In some implementations, gNB 302 may perform decoding on the data received from UE 304. However, gNB 302 may not be always successful in decoding, for example, the DMRS sequence and/or the PUSCH transmitted from UE 304. In an example implementation, UE 304 may receive a NACK (e.g., NACK associated with HARQ protocol) to indicate the decoding failure at gNB 302. In some implementations, in response to receiving the NACK from gNB 302, UE 304 may try to re-transmit the data using CG mode operations in RRC_INACTIVE state or using different procedure(s), or combinations thereof.

In an example implementation, UE 304 may try to re-transmit the data by selecting resources from the resource pools. For the re-transmission, UE 304 may try to select a DMRS sequence that is different from the DMRS sequence selected/used in an earlier attempt(s), for example, by keeping track of the DMRS sequence(s) used by the UE until the transmission is considered successful (e.g., based on a HARQ ACK received from gNB 302).

In another example implementation, UE 304 may be configured to support initiating a RA procedure if the transmitting of the data using CG mode operations in RRC_INACTIVE state fails. The number of the times the UE 304 may attempt to transmit the data using CG mode operations in RRC_INACTIVE, prior to initiating the RA procedure, state may be configured by (and/or based on) gNB 302, based on whether the data to be transmitted is sensitive to, for example, latency, power, etc. For example, if UE 304 is sensitive to latency (e.g., URLLC application), UE 304 may trigger the RA procedure after one or two attempts/re-attempts. However, if UE 304 is not sensitive to latency, but sensitive to power of the UE, UE 304 may try re-transmitting the data while using CG mode operations in RRC_INACTIVE state more times than a UE that is sensitive to latency/delay.

In another additional example implementation, UE 304 may be configured to initiate an enhanced RA procedure if the transmitting of the data with CG mode operations in RRC_INACTIVE state fails. The number of the times UE 304 tries to transmit the data using CG mode operations in RRC_INACTIVE state may be configured by gNB 302 based on whether the data to be transmitted is sensitive to, for example, latency, UE battery power, etc. For example, if UE 304 is sensitive to latency (e.g., URLLC application), UE 304 may trigger the enhanced RA procedure after one or two attempts/re-attempts. However, if UE 304 is not sensitive to latency, but sensitive to UE power, UE 304 may try re-transmitting the data using CG mode operations in RRC_INACTIVE for additional attempts when compared to a UE that is sensitive to latency.

In some implementations, combination of transmitting, re-transmitting, initiating enhanced RA procedure, and/or RA procedure, in any order (and any number of tries) may be used for transmitting the data from the UE to the network node.

In some implementations, the above described procedures may be used for device-to-device (D2D) communications as well with both the devices in the cell coverage of the same gNB or different gNBs.

In some implementations, a UE may determine the fallback mode (e.g., fallback procedure to use) based on, for example, a network indication. The indication may be received during configuration or activation of CG mode operations in RRC_INACTIVE state or when sending a NACK to the UE. The UE, based on the indication, may select the fallback mode.

Thus, as described above, a UE may transmit data to a gNB using CG mode operations in RRC_INACTIVE state, for example, to reduce latency, signalling data, power usage, etc.

Although the procedures above are described in the context of an uplink, the CG mode operations used for uplink transmissions may be applied for downlink transmissions as well, for example, semi-persistent scheduling (SPS). In some implementations, the reception of a paging message while the UE is in RRC_INACTIVE state may act as a trigger for the UE to activate SPS allocation/configuration which may have been received while the UE was in RRC_CONNECTED state.

Example 1. A method of transmitting data from a user equipment (UE), comprising: detecting, by the user equipment (UE), presence of data for transmitting from the user equipment (UE) to a network node, the user equipment (UE) in an inactive radio resource control (RRC) state; determining whether the user equipment (UE) allows a mode of operation using pre-allocated resources in the inactive radio resource control (RRC) state for user data transmission; and transmitting, in response to determining that the user equipment (UE) allows the mode of operation using pre-allocated resources in the inactive radio resource control (RRC) state for user data transmission, the data from the user equipment (UE) to the network node.

Example 2. The method of Example 1, wherein the determining further includes: determining whether the user equipment (UE) is configured to allow the mode of operation to transmit the data from the user equipment (UE), while the user equipment (UE) remains in the inactive radio resource control (RRC) state.

Example 3. The method of any of Examples 1-2, wherein the mode of operations are configured and/or activated at the user equipment (UE) via an indication received from the network node via:

a system information block (SIB) message, or a radio resource control (RRC) message, or a downlink control indicator (DCI) message, when the user equipment (UE) is in an RRC_CONNECTED state, RRC_IDLE state, RRC_INACTIVE state, or in RRC transition.

Example 4. The method of any of Examples 1-3, wherein the configuration of the mode of operations includes configuring the user equipment (UE) with one or more resource pools, the one or more resource pools assigned by the network node.

Example 5. The method of any of Examples 1-4, further comprising: selecting one or more resources from the one or more resource pools for transmitting the data.

Example 6. The method of any of Examples 1-5, wherein the selecting one or more resources includes: selecting one or more time-frequency resources from a pool of time-frequency resources; and/or selecting a demodulation reference signal (DMRS) sequence from a pool of demodulation reference signal (DMRS) sequences.

Example 7. The method of any of Examples 1-6, wherein the selecting is performed in a pseudo-random manner or according to an instruction received via the indication from the network node.

Example 8. The method of any of Examples 1-7, further comprising: identifying that decoding of a reference signal or a uplink data channel associated with the data transmitted failed at the network node; and in response to identifying that the decoding failed, re-transmitting the data by the user equipment (UE) using the mode of operations that uses pre-allocated resources in the inactive radio resource control (RRC) state, the re-transmitting configuration received via the indication.

Example 9. The method of any of Examples 1-8, further comprising: identifying that decoding of a reference signal or an uplink data channel associated with the data transmitted failed at the network node; and in response to identifying that the decoding failed, initiating an enhanced random access (RA) procedure by the user equipment (UE) for transmitting the data.

Example 10. The method of any of Examples 1-9, further comprising: identifying that decoding of a reference signal or an uplink data channel associated with the data transmitted failed at the network node; and in response to identifying that the decoding failed, initiating a random access (RA) procedure by the user equipment (UE) and transmitting the data.

Example 11. The method of any of Examples 110, wherein the reference signal is a demodulation reference signal (DMRS) sequence and/or the uplink data channel is a physical uplink shared channel (PUSCH).

Example 12. The method of any of Examples 1-11, wherein the transmitting is performed using a first demodulation reference signal (DMRS) sequence, and wherein the re-transmitting is performed using a second demodulation reference signal (DMRS) sequence.

Example 13. The method of any of Examples 1-12, wherein determining that the decoding of the data failed is based at least on: receiving, from the network node, a hybrid automatic repeat request (HARQ) negative acknowledgement (NACK) associated with the transmitting of the data.

Example 14. The method of any of Examples 1-13, wherein the re-transmitting, the initiating an enhanced random access (RA) procedure, or the initiating a random access (RA) procedure is based on an indication from the network node.

Example 15. The method of any of Examples 1-14, wherein detecting the presence of the data for transmitting from the user equipment (UE) includes: detecting the presence of the data in a packet data convergence protocol (PDCP), a radio link control (RLC), or a media access control (MAC) buffer at the user equipment (UE).

Example 16. The method of any of Examples 1-15, wherein determining whether the user equipment (UE) allows the mode of operations in the inactive radio resource control (RRC) state further includes: determining that the user equipment (UE) is configured for the mode of operations in the inactive radio resource control (RRC) state; determining that the mode of operations in the inactive radio resource control (RRC) state is activated; and determining that criterion to use the mode of operations in the inactive radio resource control (RRC) state is satisfied.

Example 17. The method of any of Examples 1-16, wherein the inactive radio resource control (RRC) state comprises a radio resource control (RRC)_INACTIVE state of a 5G New Radio (NR) system.

Example 18. The method of any of Examples 1-17, wherein the mode of operations using pre-allocated resources comprises configured grant (CG) operations or semi-persistent scheduling (SPS).

Example 19. An apparatus comprising at least one processor and at least one memory including computer instructions, when executed by the at least one processor, cause the apparatus to perform a method of any of Examples 1-18.

Example 20. An apparatus comprising means for performing a method of any of Examples 1-18.

Example 21. A non-transitory computer-readable storage medium having stored thereon computer executable program code which, when executed on a computer system, causes the computer system to perform the steps of any of Examples 1-18.

Example 22. An apparatus comprising at least one processor and at least one memory including computer instructions, when executed by the at least one processor, cause the apparatus to: detect, by a user equipment (UE), presence of data for transmitting from the user equipment (UE) to a network node, the user equipment (UE) in an inactive radio resource control (RRC) state; determine whether the user equipment (UE) allows a mode of operation using pre-allocated resources in the inactive radio resource control (RRC) state for user data transmission; and transmit, in response to determining that the user equipment (UE) allows the mode of operations using pre-allocated resources in the inactive radio resource control (RRC) state for user data transmission, the data from the user equipment (UE) to the network node.

Example 23. An apparatus comprising: means for detecting, by a user equipment (UE), presence of data for transmitting from the user equipment (UE) to a network node, the user equipment (UE) in an inactive radio resource control (RRC) state; means for determining whether the user equipment (UE) allows a mode of operation using pre-allocated resources in the inactive radio resource control (RRC) state for user data transmission; and means for transmitting, in response to determining that the user equipment (UE) allows the mode of operations using pre-allocated resources in the inactive radio resource control (RRC) state for user data transmission, the data from the user equipment (UE) to the network node.

Example 24. A method of communications, comprising: transmitting, by a network node, configuration to a user equipment (UE), the configuration indicating whether the UE is allowed to use pre-allocated resources in an inactive radio resource control (RRC) state; and receiving, by the network node, data from the UE, the data being received using the pre-allocated resources.

Example 25. The method of Example 24, further comprising: transmitting, by the network node, an ACK or NACK to the UE based on whether decoding of the data is successful.

Example 26. The method of any of Examples 24-25, further comprising: indicating a fallback procedure for the UE.

Figure 7:
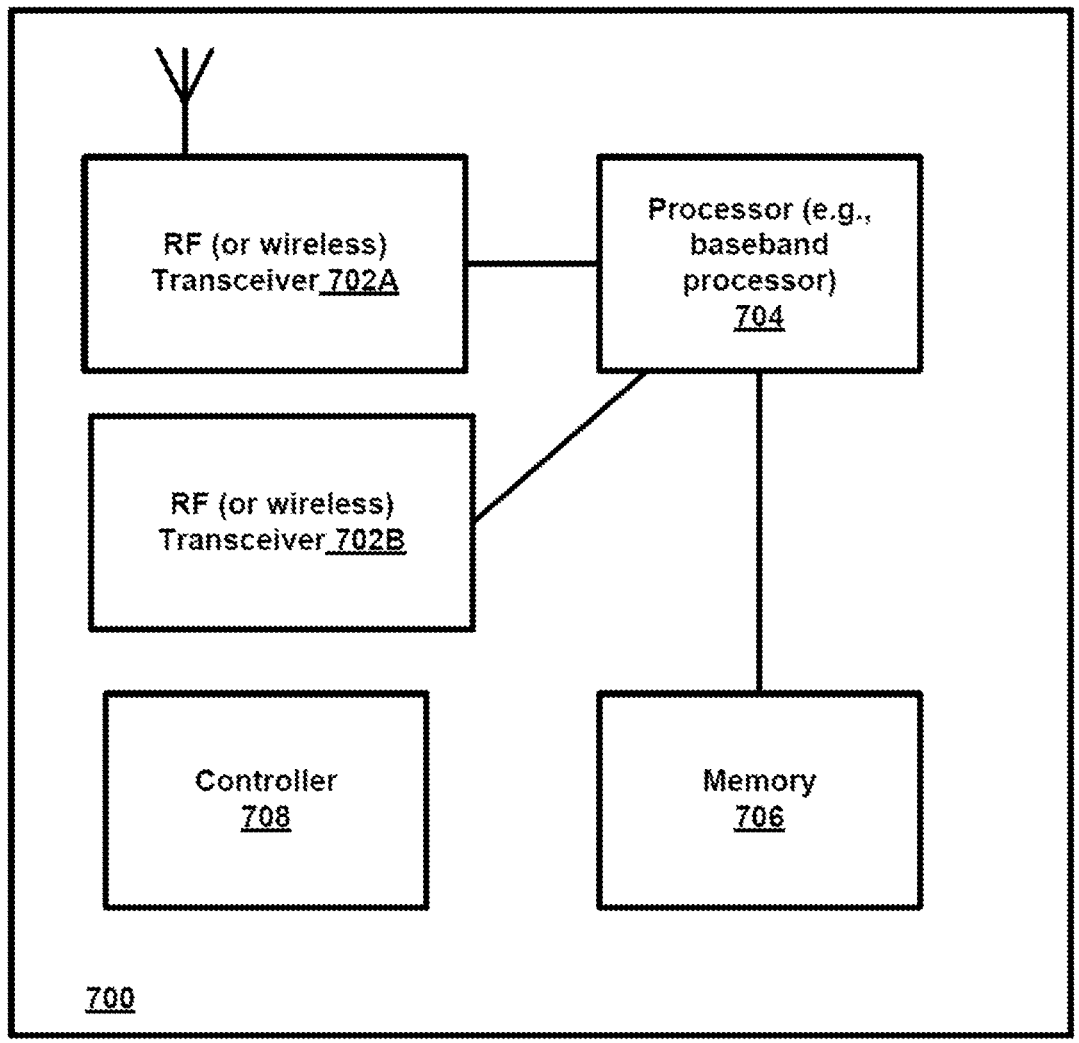
FIG. 7 is a block diagram of a node or wireless station (e.g., base station/access point or mobile station/user device/UE), according to an example implementation.

FIG. 7 is a block diagram of a wireless station (e.g., user equipment (UE)/user device or AP/gNB) 700 according to an example implementation. The wireless station 700 may include, for example, one or more RF (radio frequency) or wireless transceivers 702A, 702B, where each wireless transceiver includes a transmitter to transmit signals and a receiver to receive signals. The wireless station also includes a processor or control unit/entity (controller) 704/708 to execute instructions or software and control transmission and receptions of signals, and a memory 706 to store data and/or instructions.

Processor 704 may also make decisions or determinations, generate frames, packets or messages for transmission, decode received frames or messages for further processing, and other tasks or functions described herein. Processor 704, which may be a baseband processor, for example, may generate messages, packets, frames or other signals for transmission via wireless transceiver 702 (702A or 702B). Processor 704 may control transmission of signals or messages over a wireless network, and may control the reception of signals or messages, etc., via a wireless network (e.g., after being down-converted by wireless transceiver 702, for example). Processor 704 may be programmable and capable of executing software or other instructions stored in memory or on other computer media to perform the various tasks and functions described above, such as one or more of the tasks or methods described above. Processor 704 may be (or may include), for example, hardware, programmable logic, a programmable processor that executes software or firmware, and/or any combination of these. Using other terminology, processor 704 and transceiver 702 together may be considered as a wireless transmitter/receiver system, for example.

In addition, referring to FIG. 7, a controller (or processor) 708 may execute software and instructions, and may provide overall control for the station 700, and may provide control for other systems not shown in FIG. 7, such as controlling input/output devices (e.g., display, keypad), and/or may execute software for one or more applications that may be provided on wireless station 700, such as, for example, an email program, audio/video applications, a word processor, a Voice over IP application, or other application or software. Moreover, a storage medium may be provided that includes stored instructions, which when executed by a controller or processor may result in the processor 704, or other controller or processor, performing one or more of the functions or tasks described above.

According to another example implementation, RF or wireless transceiver(s) 702A/702B may receive signals or data and/or transmit or send signals or data. Processor 704 (and possibly transceivers 702A/702B) may control the RF or wireless transceiver 702A or 702B to receive, send, broadcast or transmit signals or data.

The aspects are not, however, restricted to the system that is given as an example, but a person skilled in the art may apply the solution to other communication systems. Another example of a suitable communications system is the 5G concept. It is assumed that network architecture in 5G will be quite similar to that of the LTE-advanced. 5G is likely to use multiple input-multiple output (MIMO) antennas, many more base stations or nodes than the LTE (a so-called small cell concept), including macro sites operating in co-operation with smaller stations and perhaps also employing a variety of radio technologies for better coverage and enhanced data rates.

It should be appreciated that future networks will most probably utilize network functions virtualization (NFV) which is a network architecture concept that proposes virtualizing network node functions into "building blocks" or entities that may be operationally connected or linked together to provide services. A virtualized network function (VNF) may comprise one or more virtual machines running computer program codes using standard or general type servers instead of customized hardware. Cloud computing or data storage may also be utilized. In radio communications this may mean node operations may be carried out, at least partly, in a server, host or node operationally coupled to a remote radio head. It is also possible that node operations will be distributed among a plurality of servers, nodes or hosts. It should also be understood that the distribution of labor between core network operations and base station operations may differ from that of the LTE or even be non-existent.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device or in a propagated signal, for execution by, or to control the operation of, a data processing apparatus, e.g., a programmable processor, a computer, or multiple computers. Implementations may also be provided on a computer readable medium or computer readable storage medium, which may be a non-transitory medium. Implementations of the various techniques may also include implementations provided via transitory signals or media, and/or programs and/or software implementations that are downloadable via the Internet or other network(s), either wired networks and/or wireless networks. In addition, implementations may be provided via machine type communications (MTC), and also via an Internet of Things (IOT).

The computer program may be in source code form, object code form, or in some intermediate form, and it may be stored in some sort of carrier, distribution medium, or computer readable medium, which may be any entity or device capable of carrying the program. Such carriers include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers.

Furthermore, implementations of the various techniques described herein may use a cyber-physical system (CPS) (a system of collaborating computational elements controlling physical entities). CPS may enable the implementation and exploitation of massive amounts of interconnected ICT devices (sensors, actuators, processors microcontrollers, . . . ) embedded in physical objects at different locations. Mobile cyber physical systems, in which the physical system in question has inherent mobility, are a subcategory of cyber-physical systems. Examples of mobile physical systems include mobile robotics and electronics transported by humans or animals. The rise in popularity of smartphones has increased interest in the area of mobile cyber-physical systems. Therefore, various implementations of techniques described herein may be provided via one or more of these technologies.

A computer program, such as the computer program(s) described above, can be written in any form of programming language, including compiled or interpreted languages, and can be deployed in any form, including as a stand-alone program or as a module, component, subroutine, or other unit or part of it suitable for use in a computing environment. A computer program can be deployed to be executed on one computer or on multiple computers at one site or distributed across multiple sites and interconnected by a communication network.

Method steps may be performed by one or more programmable processors executing a computer program or computer program portions to perform functions by operating on input data and generating output. Method steps also may be performed by, and an apparatus may be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer, chip or chipset. Generally, a processor will receive instructions and data from a read only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto optical disks, or optical disks. Information carriers suitable for embodying computer program instructions and data include all forms of non volatile memory, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

The invention claimed is:

1. An apparatus comprising at least one processor and at least one memory including computer instructions, when executed by the at least one processor, cause the apparatus to:
   detect presence of data for transmitting from a user equipment to a network node, the user equipment in an inactive radio resource control state;
   determine whether the user equipment allows a mode of operation using pre-allocated resources in the inactive radio resource control (RRC) state for user data transmission by:
      determining that the user equipment is configured for the mode of operations in the inactive radio resource control state;
      determining that the mode of operations in the inactive radio resource control state is activated; and
      determining that at least one criterion to use the mode of operations in the inactive radio resource control state is satisfied; and
   transmit, in response to determining that the user equipment allows the mode of operation using pre-allocated resources in the inactive radio resource control state for user data transmission, the data from the user equipment to the network node.

2. The apparatus of claim 1, wherein the processor, the memory, and the computer program code are configured to cause the apparatus to:
   determine whether the user equipment is configured to allow the mode of operation to transmit the data from the user equipment, while the user equipment remains in the inactive radio resource control state.

3. The apparatus of claim 1, wherein the mode of operation is configured and/or activated at the user equipment via an indication received from the network node via:
   a system information block message, or
   a radio resource control message, or
   a downlink control indicator message,
   when the user equipment is in an RRC_CONNECTED state, RRC_IDLE state, RRC_INACTIVE state, or in RRC transition.

4. The apparatus of claim 1, wherein the configuration of the mode of operations includes configuring the user equipment with one or more resource pools, the one or more resource pools assigned by the network node.

5. The apparatus of claim 1, wherein the processor, the memory, and the computer program code are configured to cause the apparatus to:
   select one or more resources from the one or more resource pools for transmission of the data.

6. The apparatus of claim 1, wherein the processor, the memory, and the computer program code are configured to cause the apparatus to:
   select a demodulation reference signal sequence from a pool of demodulation reference signal sequences.

7. The apparatus of claim 1, wherein the processor, the memory, and the computer program code are configured to cause the apparatus to detect the presence of the data for transmitting from the user equipment by:
   detecting the presence of the data in a packet data convergence protocol, a radio link control, or a media access control buffer at the user equipment.

8. The apparatus of claim 1, wherein the inactive radio resource control state comprises a radio resource control INACTIVE state of a 5G New Radio system.

9. The apparatus of claim 1, wherein the mode of operations using pre-allocated resources comprises configured grant operations.

10. A method for a user equipment comprising:
- detecting presence of data for transmitting from the user equipment to a network node, the user equipment in an inactive radio resource control state;
- determining whether the user equipment allows a mode of operation using pre-allocated resources in the inactive radio resource control (RRC) state for user data transmission by:
  - determining that the user equipment is configured for the mode of operations in the inactive radio resource control state;
  - determining that the mode of operations in the inactive radio resource control state is activated; and
  - determining that at least one criterion to use the mode of operations in the inactive radio resource control state is satisfied; and
- transmitting, in response to determining that the user equipment allows the mode of operation using pre-allocated resources in the inactive radio resource control state for user data transmission, the data from the user equipment to the network node.

11. The method of claim 10, further comprising:
- determining whether the user equipment is configured to allow the mode of operation to transmit the data from the user equipment, while the user equipment remains in the inactive radio resource control state.

12. The method of claim 10, wherein the mode of operation is configured and/or activated at the user equipment via an indication received from the network node via:
- a system information block message, or
- a radio resource control message, or
- a downlink control indicator message,
- when the user equipment is in an RRC_CONNECTED state, RRC_IDLE state, RRC_INACTIVE state, or in RRC transition.

13. The method of claim 10, wherein detecting the presence of the data for transmitting from the user equipment comprises:
- detecting the presence of the data in a packet data convergence protocol, a radio link control, or a media access control buffer at the user equipment.

14. The method of claim 10, wherein the inactive radio resource control state comprises a radio resource control INACTIVE state of a 5G New Radio system.

15. The method of claim 10, wherein the mode of operations using pre-allocated resources comprises configured grant operations.

* * * * *